United States Patent [19]

Takei et al.

[11] Patent Number: 4,696,008
[45] Date of Patent: Sep. 22, 1987

[54] DATA STORING DEVICE HAVING POSITION DETERMINING MEANS

[75] Inventors: Masahiro Takei, Kanagawa; Susumu Kozuki, Tokyo; Toshiyuki Masui; Masahide Hirasawa, both of Kanagawa; Motokazu Kashida, Tokyo, all of Japan

[73] Assignee: Canon Kabushiki Kaisha

[21] Appl. No.: 675,766

[22] Filed: Nov. 28, 1984

[30] Foreign Application Priority Data

Dec. 2, 1983 [JP] Japan ................................. 58-228689
Dec. 2, 1983 [JP] Japan ................................. 58-228690

[51] Int. Cl.⁴ .......................................... G06F 11/00
[52] U.S. Cl. ..................................... 371/47; 375/114; 371/5
[58] Field of Search ............................ 371/42, 47, 39; 340/825.14; 370/100, 104; 375/106, 114

[56] References Cited

U.S. PATENT DOCUMENTS

| 4,162,483 | 7/1979 | Entenman | 371/37 |
| 4,375,102 | 2/1983 | Van Doal | 375/106 |
| 4,404,675 | 9/1983 | Karcheuski | 371/47 |
| 4,517,682 | 5/1985 | Niyer | 371/47 |
| 4,524,445 | 6/1985 | Fujii | 371/47 |
| 4,525,840 | 6/1985 | Heinz | 371/47 |
| 4,589,066 | 5/1986 | Lam | 371/47 |

Primary Examiner—Michael R. Fleming
Attorney, Agent, or Firm—Toren, McGeady & Associates

[57] ABSTRACT

A data storing device in which output data of a counter, which counts synchronizing data in a plurality of transmitted data blocks, and address data in the blocks are selectively outputted by detecting errors in the blocks, and the storing position in a memory is determined on the basis of the selected output data.

9 Claims, 8 Drawing Figures

FIG.3

| | ℓ1 | ℓ2 | ℓ3 | ℓ4 | ℓ5 | ℓ6 | ℓ7 | ℓ8 | ℓ9 | ℓ10 | ℓ11 | ℓ12 | ℓ13 | |
|---|---|---|---|---|---|---|---|---|---|---|---|---|---|---|
| | A0 | Q0 | L0 | L60 | L120 | L180 | P0 | L240 | L300 | L360 | L420 | | | b0 |
| | A1 | Q1 | R0 | R60 | R120 | R180 | P1 | R240 | R300 | R360 | R420 | | | b1 |
| | A2 | Q2 | L3 | L63 | L123 | L183 | P2 | L243 | L303 | L363 | L423 | | | b2 |
| | A3 | Q3 | R3 | R63 | R123 | R183 | P3 | R243 | R303 | R363 | R423 | | | b3 |
| | ⋮ | ⋮ | ⋮ | ⋮ | ⋮ | ⋮ | ⋮ | ⋮ | ⋮ | ⋮ | ⋮ | | | |
| | A38 | Q38 | L57 | L117 | L177 | L237 | P38 | L297 | L357 | L417 | L477 | | | b38 |
| | A39 | Q39 | R57 | R117 | R177 | R237 | P39 | R297 | R357 | R417 | R477 | | | b39 |
| | A40 | Q40 | L1 | L61 | L121 | L181 | P40 | L241 | L301 | L361 | L421 | | | b40 |
| | A41 | Q41 | R1 | R61 | R121 | R181 | P41 | R241 | R301 | R361 | R421 | | | b41 |
| | A42 | Q42 | L4 | L64 | L124 | L184 | P42 | L244 | L304 | L364 | L424 | | | b42 |
| | A43 | Q43 | R4 | R64 | R124 | R184 | P43 | R244 | R304 | R364 | R424 | | | b43 |
| | ⋮ | ⋮ | ⋮ | ⋮ | ⋮ | ⋮ | ⋮ | ⋮ | ⋮ | ⋮ | ⋮ | | | |
| | A78 | Q78 | L58 | L118 | L178 | L238 | P78 | L298 | L358 | L418 | L478 | | | b78 |
| | A79 | Q79 | R58 | R118 | R178 | R238 | P79 | R298 | R358 | R418 | R478 | | | b79 |
| | A80 | Q80 | L2 | L62 | L122 | L182 | P80 | L242 | L302 | L362 | L422 | | | b80 |
| | A81 | Q81 | R2 | R62 | R122 | R182 | P81 | R242 | R302 | R362 | R422 | | | b81 |
| | A82 | Q82 | L5 | L65 | L125 | L185 | P82 | L245 | L305 | L365 | L425 | | | b82 |
| | A83 | Q83 | R5 | R65 | R125 | R185 | P83 | R245 | R305 | R365 | R425 | | | b83 |
| | ⋮ | ⋮ | ⋮ | ⋮ | ⋮ | ⋮ | ⋮ | ⋮ | ⋮ | ⋮ | ⋮ | | | |
| | A118 | Q118 | L59 | L119 | L179 | L239 | P118 | L299 | L359 | L419 | L479 | | | b118 |
| | A119 | Q119 | R59 | R119 | R179 | R239 | P119 | R299 | R359 | R419 | R479 | | | b119 |

SYNC — CRCC

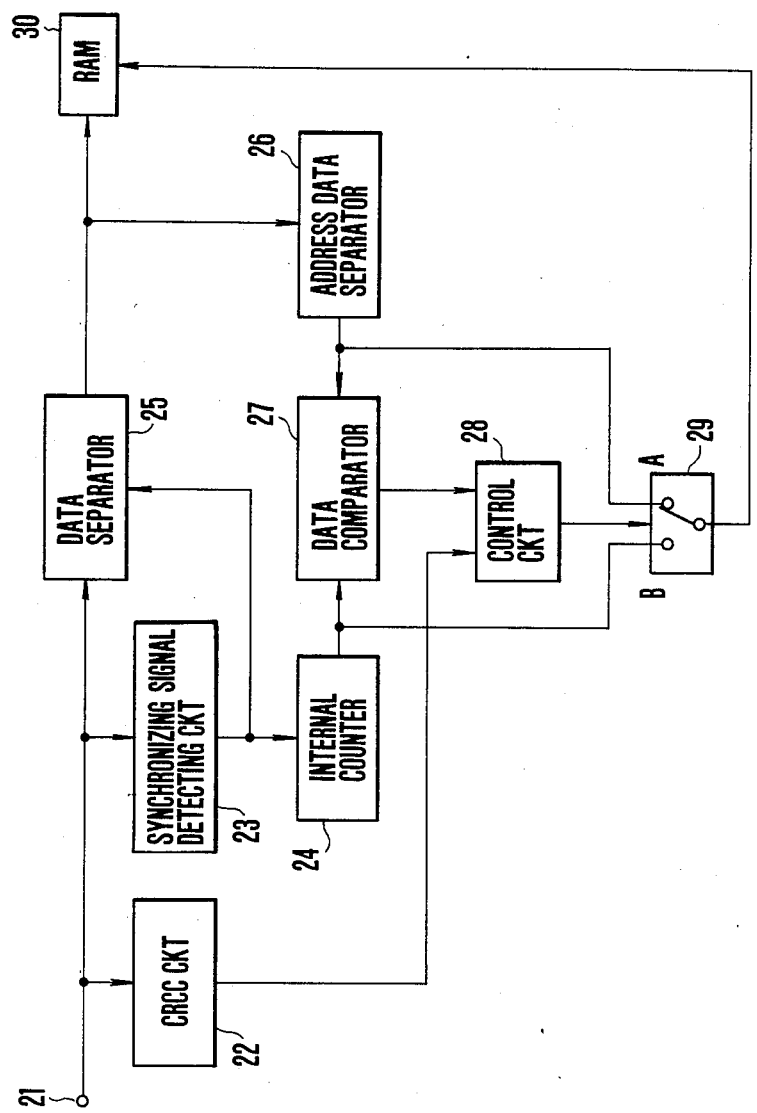

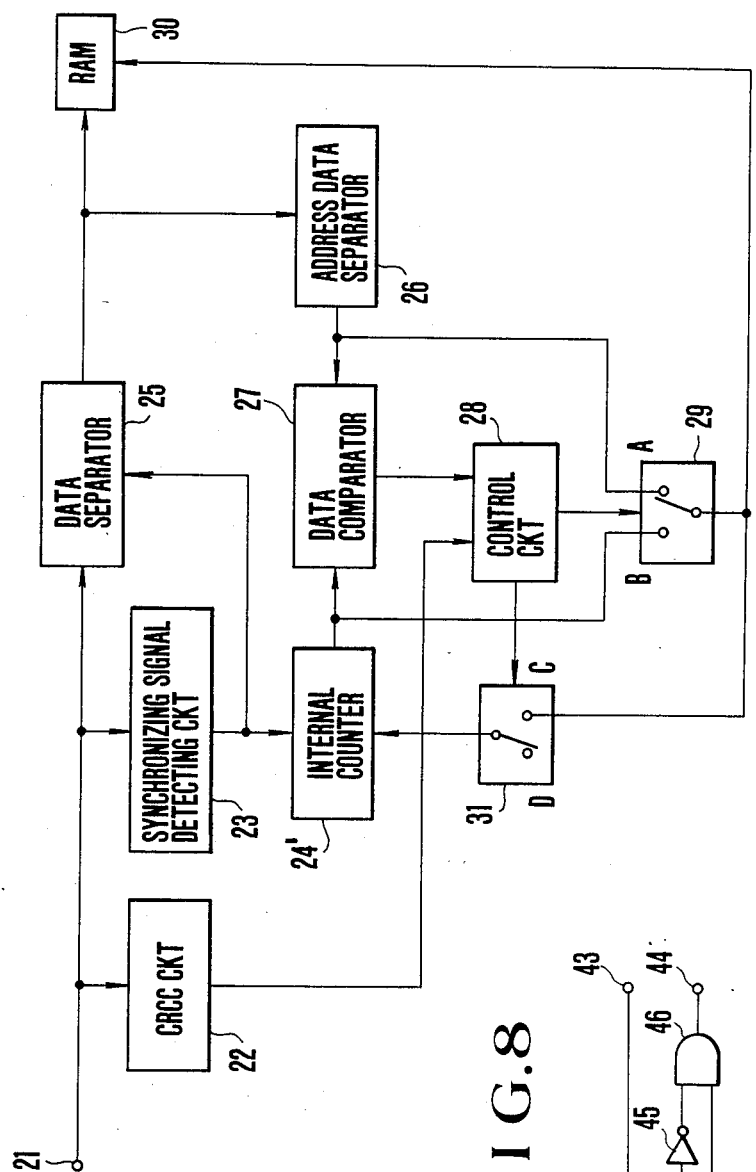

DATA STORING DEVICE HAVING POSITION DETERMINING MEANS

BACKGROUND OF THE INVENTION

1. Field of the Invention

This invention relates to a data processing device, and more particularly, to a device for processing a plurality of transmitted data blocks each including a synchronizing data and an address data.

2. Description of the Prior Art

Generally, a system for transmitting data sequences including information data is required to perform such processes as the correction of errors in codes, and the arrangement of information data after transmission, such as recording or reproduction. Thus, the transmitted data must be first stored in a memory such as a random access memory (RAM). At that time, all of the data must be stored into predetermined positions in the memory in accordance with address data which is provided in front of them.

However, since the address data is also to be transmitted in the same manner as the information data, they are subject to some code errors due to drop-out, jitter, intersymbol interference, etc. Therefore, it is not always safe to have the information data stored in the memory solely in accordance with the transmitted address data. In view of this, it has been known to generate data similar to the address data by counting the synchronizing data included in each of the data blocks simultaneously with the address data. In other words, the data storing positions in the memory are determined by means of a counter, called an internal address counter. However, since this method is to be carried out by counting the synchronizing data, which is also transmsitted, a count value obtainable in this method is also subject to error due to possible drop-out of the synchronizing data, noise, etc. It is especially a serious drawback of this method that, once the synchronizing data is miscounted, the ensuing data will all become invalid.

SUMMARY OF THE INVENTION

It is a general object of this invention to eliminate the drawbacks of the data processing devices of the prior art as mentioned above.

A more specific object of the invention is to provide a data processing device which is capable of restoring address data, with a simple arrangement, back to their state before transmission.

Another object of the invention is to provide a data processing device which is capable of correctly determining the position into which information data is to be written in the memory.

Under these objects, a data processing device embodying an aspect of this invention and arranged to process a plural of transmitted data blocks, each including a synchronizing data and an address data, comprises counting means arranged to operate according to the synchronizing data included in the data blocks; separating means arranged to separate the address data included in the data blocks; and output means arranged to selectively output the output data of said counting means or the address data separated by the separating means.

A further object of this invention is to provide a data processing device which is capable of correcting, with a simple arrangement, a miscount of the address counter. Under this object, a data processing device, which embodies an aspect of this invention and is arranged to process transmitted plural data blocks, each including a synchronizing data and an address data, comprises counting means arranged to operate according to the synchronizing data included in the data blocks; separating means for separating the address data included in the data blocks; and control means for bringing the address data separated by said separating means and the output of the counting means into a predetermined relation with each other.

These and further objects and features of the invention will become apparent from the following detailed description of the preferred embodiments thereof, taken in connection with the accompanying drawings.

BRIEF DESCRIPTION OF THE DRAWINGS

FIG. 3 shows, by way of example, a data matrix format.

FIG. 6 is a circuit diagram showing the reproduced data processing system of a VTR embodying this invention.

FIG. 7 is a circuit diagram showing the reproduced data processing system of a VTR arranged as another embodiment of this invention.

FIG. 8 is a circuit diagram showing, by way of example, the arrangement of a control circuit included in the system shown in FIG. 7.

DETAILED DESCRIPTION OF THE PREFERED EMBODIMENTS

The following description shows details of embodiments in which the data processing system according to this invention is applied to the digital audio signal recording and/or reproducing systems of video tape recorders (VTR's).

Figure 1:
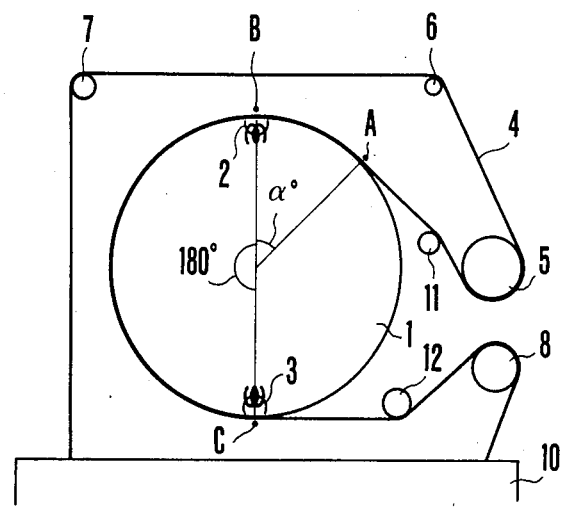
FIG. 1 is a schematic illustration of the tape transport system of a VTR to which the present invention is applied.

FIG. 1 schematically shows the tape transport system of a VTR which is arranged as an embodiment of this invention. The illustration includes a rotary drum 1; rotating heads 2 and 3; a magnetic tape 4; moving guide posts 5, 6, 7 and 8 which are arranged to have the tape 4 wound around the drum 1 by pulling the tape out of a cassette 10; and fixed guide posts 11 and 12. The heads 2 and 3 are arranged as shown at a phase difference of 180 degrees on the drum 1 to record on the tape 4 a digital audio signal while moving from a point A to a point B and a video signal while moving from the point B to another point C. These heads helical recording tracks on the tape 4 while performing a recording operation thereon.

Figure 2:
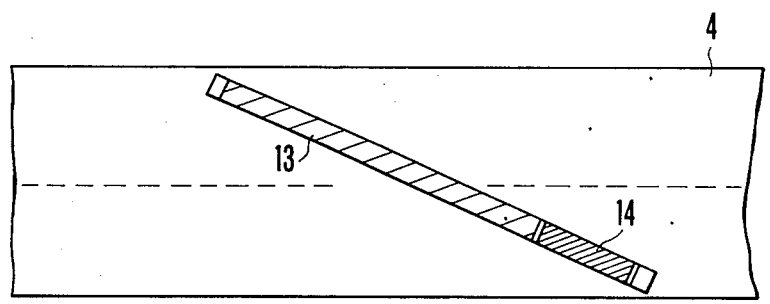
FIG. 2 is a schematic illustration of a recording format in accordance with which the VTR shown in FIG. 1 performs recording on a tape.

FIG. 2 shows a format in accordance with which recording is to be made on the tape 4 by the VTR of FIG. 1. One field portion of the video signal is to be recorded in an area 13. One field period portion of the digital audio signal is to be recorded in another area 14. The digital audio signal to be recorded in the area 14 is obtained, for example, by connecting a sample of an audio signal into a PCM (pulse code modulated) signal and by carrying out time base compression to frequency-modulate it before recording.

An example of the data format for the digital audio signal is as shown in FIG. 3. The format of FIG. 3 represents the studio signal for one field period portion of the video signal. A sampling frequency fs is assumed to be $fs=480\times fv$, wherein fv represents the field frequency. In FIG. 3, reference numerals b0–b119 denote data blocks; l1–l113 denote data word columns; A0–A119 denote data words for designating addresses; Q0–Q119 respectively denote parity words for error correction; L0–L479 denote data words of the audio signal of a channel L; and R0–R479 denote data words of the audio signal of a channel R. Each of the data blocks includes a synchronizing data in the column l1; an address designating data word in the column l2; audio signal data of 8 words in the columns l4–l7 and l9–l12; error correction data of 2 words in the columns l3 and l8; and a cyclic redundancy check code (hereinafter will be referred to as CRCC) in the column l13. For example, each of the data blocks consists of 3 bits in the column l1, 8 bits in each of the columns l2–l12 and 16 bits in the column l13 respectively. The above-stated parity words may alternatively be arranged in accordance with a known cross interleave method instead of the method called "work interleave method" which is shown in FIG. 3.

Figure 4:
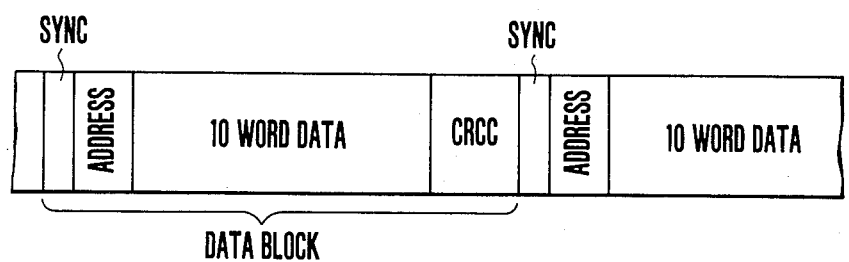
FIG. 4 is a timing chart showing a sequence of data transmission.

The data matrx obtained in accordance with the above-stated format is transmitted sequentially one data block after another as shown in FIG. 4, each of the data blocks including the address data and the synchronizing data. One data matrix is thus arranged to be recorded within the area 14 shown in FIG. 2. More specifically, following the synchronizing data of three bits of the data block b0, the data words A0, Q0, L0, L60, L120, L180, P0, L240, L300, L360, L420, the CRCC of the data block b0, the synchronizing data of another data block b1, the data words A1, Q1, R0, R60, --- are recorded one after another until the CRCC of the data block b119 is recorded.

In reproducing this record, any error within each data block is detected by use of the CRCC. After that, the whole matrix must be retrieved by means of the parity words. For this purpose, these data must be entered into a memory such as a RAM or the like before processing them. At that time, the data of ten words are stored into the RAM according to the address data disposed in front of them.

Figure 5:
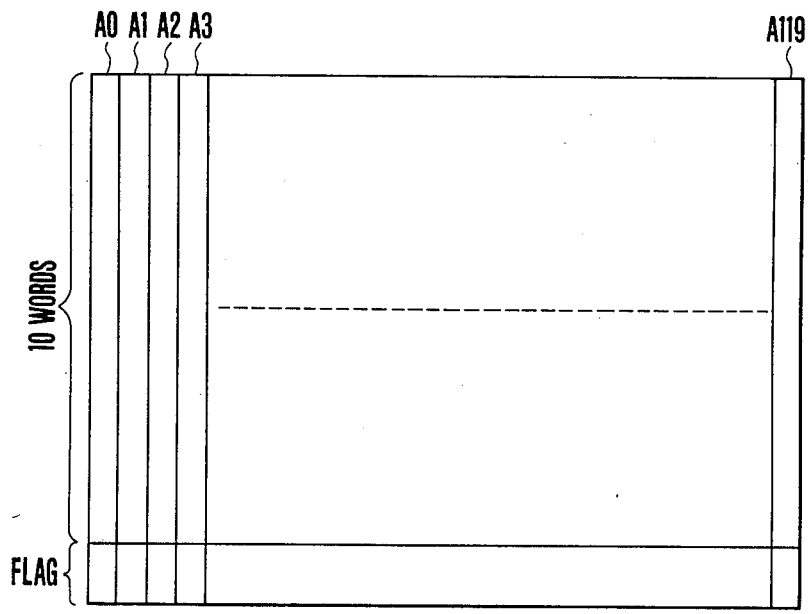
FIG. 5 is a chart showing data stored in a RAM.

FIG. 5 shows the state of the RAM having these data stored therein in the manner as mentioned above. The ten-word data of each data block is stored in an area on the RAM corresponding to applicable one of the addresses A0–A119. A data obtained as a result of error retrieval corresponding to each word of the ten word data is stored in a part indicated as "flag" in FIG. 5. In this part (hereinafter referred to as the flag part), the correctness or wrongness of each of the ten words is stored as "0" or "1". In other words, the flag consists of at least 10 bits (for example, 2 bytes = 16 bits).

Any data error of each data block is detected by using the CRCC before the data corresponding to the one filed period portion of the audio signal is thus stored on the RAM in the above-stated manner. In the event that an error is thus detected using the CRCC in one of the data blocks, it indicates that one or the ten words or the address data is in error. In other words, the address data might be in error. In that event, therefore, it is unsafe to determine the storing position on the RAM according to the address data. If the address data is erroneous, it is not only the data included in the data block in question that become invalid, but also all the ensuing data would be affected by this error.

FIG. 6 is a block diagram showing a reproduced data processing system of a VTR arranged as an embodiment of this invention. Referring to FIG. 6, a terminal 21 is arranged to receive a data which is reproduced by the heads 2 and 3 and is frequency modulated. The data is supplied in the manner as shown in FIG. 4. The input data thus received is supplied to a CRCC circuit 22, a synchronizing signal detecting circuit 23 and a data separator 25. At the circuit 22, the above-stated CRCC is separated. The synchronizing data is separated at the circuit 23 while the address data and the ten word data are separated at the separator 25.

The data separator 25 operates on the basis of the synchronizing data detected by the synchronizing signal detecting circuit 23. The detected synchronizing data which is thus obtained from the circuit 23 is supplied to an internal counter 24. The internal counter 24 counts the synchronizing data to determine thereby the address at which the received data block is to be stored.

The output of the data separator 25 is supplied to an address data separator 26 and the address data is separated at the circuit 26. The address data thus obtained and an address value which is produced as a data from the above-stated counter 24 are supplied to a data comparator 27. The data comparator 27 determines whether these two data are in agreement with each other. The output of the data comparator 27 is supplied to a control circuit 28. To the control circuit 28 is also supplied the error detection output of the CRCC circuit 22 relative to each of the data blocks. The control circuit 28 then controls a data selector 29 according to the two data supplied thereto. In accordance with the output of the control circuit 28, the data selector 29 selects and determines whether the address at which the ten word data is to be stored on the RAM should be determined according to the output of the internal counter 24 or according to the address data obtained at the address data separator 26. If the checking output of the CRCC circuit 22 is indicative of correctness, the address data obtained at the address data separator 26 includes no error. In that case, therefore, the data is stored on the RAM 30 according to the address data received via a terminal A of the selector 29. However, in case this address data coincides with the output of the internal counter 24, the data storing address may be determined according to either of them. In the event that the output of the CRCC circuit 22 is indicative of "wrongness", it is unsafe to use the address data obtained at the address data separator 26. In that event, it is preferable to use the output of the internal counter 24. Particularly, in that event, if the data comparator 27 determines that the address data obtained from the address data separator 26 does not coincide with the output of the internal counter 24, the probability of an error in the separated address data is very high. In such a case, therefore, the storing address is controlled by supplying the output of the internal counter 24 to the RAM 30 via a terminal B of the selector 29. However, if the address data obtained from the address data separator 26 is in agreement with the output of the internal counter 24, either of them may be used, as both of them are naturally considered to be correct.

With the storing address on the RAM 30 determined according to the address value selected and produced from the selector 29 in this manner, the drawbacks of the prior art systems, in which the storing address on the RAM is determined solely according to the transmitted address data or solely according to the output of an internal counter, can be eliminated with their drawbacks mutually complemented. The embodiment is, therefore, capable of accurately determining the storing position in a memory such as a RAM or the like. The ten word data thus stored in the RAM 30 has the flag data, which is obtained by means of the parity word, added thereto as mentioned in the foregoing for further correction of any error. Then, with time base expansion carried out, the ten word data is processed into a reproduced audio signal.

Further, as apparent from the foregoing description of the embodiment, if the data comparator 27 is not provided, the data is stored on the RAM according to the output of the address data separator 26 when the output of the CRCC circuit 22 corresponds to "correctness" or according to the output of the internal counter 24 when the output of the CRCC circuit 22 corresponds to "wrongness". In that instance, a similar effect can be attained with a simpler arrangement.

FIG. 7 shows a reproduced data processing system of a VTR arranged as another embodiment of the invention. In FIG. 7, components the same as those shown in FIG. 6 are indicated by the same reference numerals and the details of them is omitted from the following description: The control circuit 28' is arranged to control the data separator 29 and a load control circuit 31 according to the output of the above-stated data comparator 27 and that of the CRCC circuit 22.

Let us consider a case where the output of the CRCC circuit 22 corresponds to "correctness" while the address data extracted by the address data separator 26 and the output of the internal counter 24' are determined not to be in agreement with each other. In this instance, since the address data transmitted includes no code error therein, it is apparent that the internal counter 24' either has miscounted the synchronizing data or has counted some noise. Meanwhile, it is highly probable that, once the internal counter 24' miscounts, all ensuing count values thereof become incorrect and invalid. Therefore, in that instance, the address data obtained from the address data separator 26 is supplied to the internal counter 24' through the terminal A of the selector 29 and a terminal C of the load control circuit 31; and then the output of the internal counter 24' is made to coincide with an address data transmitted next to the above-stated address data separator. For example, the address data may be supplied to the internal counter 24' as a preset data therein. With this arrangement, the address value to be produced from the internal counter 24' again becomes reliable. With the embodiment arranged in this manner, the output of the internal counter 24' retains its reliability even in the event of probability of a code error in the address data, i.e. when the output of the CRCC circuit 22 corresponds to "wrongness", so that the storing address on the RAM 30 can be made always reliable.

FIG. 8 shows an example of details of the control circuit 28' shown in FIG. 7. Referring to FIG. 8, a terminal 41 is arranged to receive the output of the CRCC circuit 22. In the event of a code error in the data block transmitted, a high level signal is supplied to the terminal 41. Another terminal 42 is arranged to receive the output of the data comparator 27. In the event of a discrepancy between the output of the internal counter 24' and the address data obtained from the address data separator 26, a high level signal is supplied to the terminal 42. An output terminal 43 is arranged to produce a signal to be supplied to the control terminal of the data selector 29. When the signal produced from this output terminal 43 is at a low level, the data selector 29 selects the address data received from the address data separator 26 via the terminal A thereof. If the signal from the output terminal 43 of the control circuit 28' is at a high level, the data selector 29 selects the output of the internal counter 24'. Another output terminal 44 is arranged to produce a signal to be supplied to the control terminal of the load control circuit 31. It is only when the signal produced from this terminal 44 is at a high level that the load control circuit 31 allows the address data received from the selector 29 to be supplied to the internal counter 24' through a terminal C thereof. The control circuit 28 is provided further with an inverter 45 and an AND gate 46.

Such being the arrangement of the embodiment, the operation of the data selector 29 is dependent on the output of the CRCC circuit 22. The output of the internal counter 24' is selected when there is a code error in the data block. The address data transmitted is selected when there is no code error in the data block. Meanwhile, the load control circuit 31 is arranged to allow the address data which is received from the selector 29 to be supplied to the internal counter 24' as a preset data only when the output level of the CRCC circuit 22 is low and that of the data comparator 27 is high. In other words, the load control circuit 31 operates to make the output of the internal counter 24' agree with the transmitted address data only in case that the above-stated discrepancy is found through the comparison performed by the data comparator 27 while there is no code error in the data block.

With the storing address onthe RAM 30 arranged to be determined according to the address value selected by the selector 29 in the above-stated manner, the drawbacks of the prior art systems in which the storing address on the RAM is determined solely in accordance with the transmitted address data or solely in accordance with the output of an internal counter, can be eliminated with their drawbacks mutually complementing each other. The embodiment thus accurately determines the storing position on a memory such as a RAM or the like.

Further to obtain the same advantageous effect mentioned above, the embodiment may be arranged to have the storing address on the RAM controlled normally according to the output of the internal counter; and to make the output data of the internal counter coincide with the transmsitted address data and then to use the transmitted address data for controlling the storing address only when the above-stated comparison by the data comparator 27 results in an discrepancy while no code error is found in the data block transmitted via the CRCC circuit 22.

In the foregoing description of embodiment, an audio signal of a VTR to be recorded and reproduced with pulse code modulation (PCM) has been taken up by way of example. However, the invention is not limited to such applications, but is also applicable to other systems transmitting a plurality of data blocks containing synchronizing data, address data and information data for attaining the same advantageous effect of the invention.

What is claimed is:

1. A data storing device comprising:
   (a) first separation means for separating synchronizing data from a plurality of transmitted data blocks each including the synchronizing data, address data and information data;
   (b) second separation means for separating the address data from the plurality of transmitted data blocks;
   (c) counting means for counting the synchronizing data separated by said first separation means;
   (d) error detection means for detecting data errors in each of said transmitted data blocks;
   (e) output means for selectively outputting the address data separated by said second separation means or data produced by said counting means based on an output signal of said error detection means; and
   (f) storing means for storing the information data in a memory at positions determined by output data from said output means.

2. A device according to claim 1, further comprising comparison means for comparing the address data separated by said second separation means with the data produced by said counting means, and wherein said output means selectively outputs the address data separated by said second separation means and the data produced from said counting means based on an output signal of said comparison means and the output signal of said error detection means.

3. A device according to claim 2, further comprising presetting means for presetting said counting means with the address data separated by said second separation means, said presetting means operating in response to the output signal of said error detection means and the output signal of said comparison means.

4. A device according to claim 1, further comprising presetting means for presetting said counting means with the address data separted by said second separation means, said presetting means operating in response to the output signal of said error detection means.

5. A device according to claim 1, wherein each of said transmitted data blocks includes a cyclic redundancy check code, and said error detection means detects data error by using the cyclic redundancy check code.

6. A data storing device comprising:
   (a) first separation means for separating synchronizing data from a plurality of transmitted data blocks each including the synchronizing data, address data and information data;
   (b) second separation means for separating the address data from the plurality of transmitted data blocks;
   (c) counting means for counting the synchronizing data separated by said first separation means;
   (d) error detection means for detecting data errors in each of said transmitted data blocks;
   (e) presetting means for presetting and counting means with the address data separated by said second separation means, said presetting means operating in response to an output signal of said error detection means; and
   (f) storing means for storing the information data in a memory at positions determined by output data of said counting means.

7. A device according to claim 6, further comprising comparison means for comparing the address data separated by said second separation means with data produced by said counting means, and wherein said presetting means operates in response to an output signal of said comparison means and the output of said error detection means.

8. A device according to claim 6, wherein each of said transmitted data blocks includes a cyclic redundancy check code, and said error detection means detects data errors by using the cyclic redundancy check code.

9. A data storing device comprising:
   (a) first separation means for separation synchronizing data from a plurality of transmitted data blocks each including the synchronizing data, address data and information data;
   (b) second separation means for separating the address data from the plurality of transmitted data blocks;
   (c) counting means for counting the synchronizing data separated by said first separation means;
   (d) comparison means for comparing the address data separated by said second separation means with data produced from said counting means;
   (e) presetting means for presetting said counting means with the address data separated by said second separation means, said presetting means operating in response to an output signal of said comparison means; and
   (f) storing means for storing the information data in a memory at positions determined by output data of said counting means.

* * * * *